July 4, 1967  C. L. GRAFT  3,329,300
CAP FOR SOFT SEAL PLUGS
Filed Oct. 21, 1965
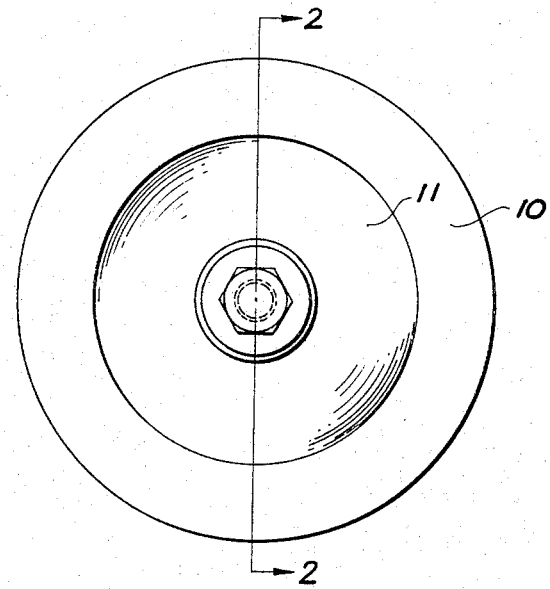
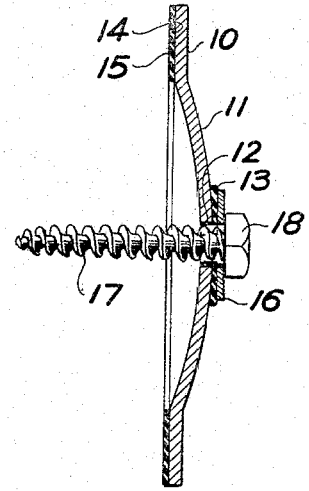
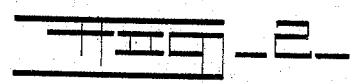
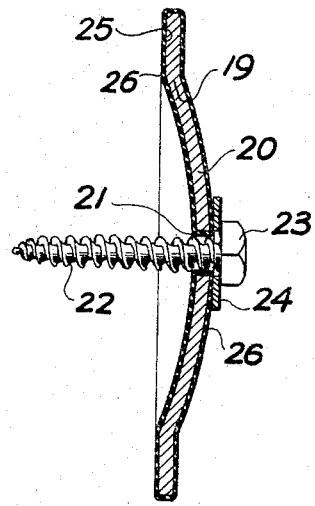
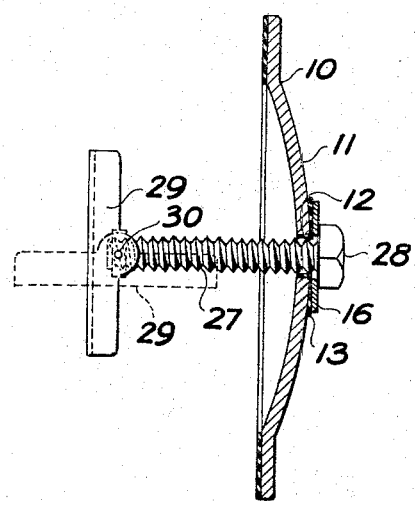
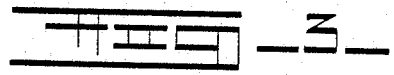
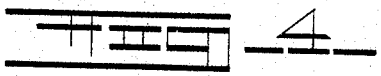
INVENTOR.
Charles L. Graft
BY
W. B. Hampman
ATTORNEY.

United States Patent Office 3,329,300
Patented July 4, 1967

3,329,300
CAP FOR SOFT SEAL PLUGS
Charles L. Graft, 7237 California, Ave.,
Youngstown, Ohio 44512
Filed Oct. 21, 1965, Ser. No. 507,605
1 Claim. (Cl. 220—25)

This application is a continuation-in-part of application Ser. No. 336,695, filed Jan. 9, 1964, now abandoned.

This invention relates to a cap in the nature of a secondary closure member for soft seal plugs and the like as found in internal combustion engines.

The principal object of the invention is the provision of a sealing cap arranged to be positioned over and engaged on a soft seal plug in sealing relation thereto.

A further object of the invention is the provision of a simple and efficient replacement for a damaged soft seal plug in an internal combustion engine block.

A still further object of the invention is the provision of a cap for a soft seal plug that may be attached to the soft seal plug from a sealing closure thereabout.

A still further object of the invention is the provision of a cap incorporating a resilient section integrally therewith for maintaining desirable tension on a sealing edge thereof.

A still further object of the invention is the provision of a sealing cap that may be affixed to an object so as to form a sealing closure relative to an area of the object covered by said cap.

The sealing cap for soft seal plugs disclosed herein is particularly useful in repairing damaged soft seal plugs found in the core openings in cast internal combustion engine blocks.

It has been common practice in the automotive industries and others to provide semi-permanent closures in the nature of soft seal plugs in core openings in engine blocks. Such plugs ordinarily prevent the escape of coolant from the coolant passageways in the engine block and are thereby subjected to rust and corrosion. They are also damaged by freezing of coolant in the block. It has heretofore been necessary to replace such damaged soft seal plugs by removing them in their entirety, cleaning out the opening in the block as by removing the scale, rust and corrosion formed therein, and obtaining and replacing a new soft seal plug of the particular size necessary to fit the opening.

The present invention relates to a cap for a soft seal plug which may be simply and easily positioned over the soft seal plug so that its peripheral edge engages the outer surface of the engine block around the opening in which the soft seal plug is located. The cap for a soft seal plug is attached directly to the soft seal plug by a metal screw positioned axially therethrough and engaged in an opening which is formed thereby in the soft seal plug.

With the foregoing and other objects in view which will appear as the description proceeds, the invention resides in the combination and arrangement of parts and in the details of construction hereinafter described and claimed, it being the intention of cover all changes and modifications of the example of the invention herein chosen for purposes of the disclosure, which do not constitute departures from the spirit and scope of the invention.

The invention is illustrated in the accompanying drawing, wherein:

FIGURE 1 is a plan view of the cap for a soft seal plug.

FIGURE 2 is a vertical section on line 2—2 of FIGURE 1.

FIGURE 3 is a vertical section of a modified form of the cap for a soft seal plug.

FIGURE 4 is a vertical section similar to FIGURE 2 and showing a different form of fastener.

By referring to the drawings and FIGURES 1 and 2 in particular, a preferred embodiment of the invention may be seen to comprise a disc 10 of suitable material, such as metal, having a central bowed portion 11 with a central opening 12 therein. There is a washer 13 of sealing material such as neoprene bonded to the bowed portion 11 around and about the central opening 12 therein and preferably extending into said opening. The back side of the cap for soft seal plugs may be seen in the cross section of FIGURE 2 to include a transversely flat angular rim 14 having an annular washer 15 of sealing material, such as neoprene, bonded thereto. A washer 16 is positioned against the sealing washer 13 and a metal screw 17 having a head 18 is positioned through the opening in the washer 16 and through the opening 12 so that it may be engaged in a soft seal plug (not shown) and by rotating the metal screw 17, the cap may be moved upwardly against the engine block (not shown) which surrounds the soft seal plug. When this occurs, the sealing washer 15 will move into sealing engagement with the block and the head 18 of the metal screw 17 and the washer 16 will move into sealing engagement against the sealing washer 13 to form a relatively tight cap.

Modifications of the device herein disclosed will occur to those skilled in the art, and one such modification may be seen by referring to FIGURE 3 of the drawings which is a vertical section similar to FIGURE 2.

By referring to FIGURE 3 of the drawings, it will be seen that a cap 19 having bowed central areas 20 has been disclosed, the cap having a central opening 21 therein through which a metal screw 22 having a head 23 may be positioned and preferably against a washer 24. The entire surface of the cap 19 including the flat peripheral flange-like head 25 covered with a resilient sealing material 26, such as neoprene. The covering may be applied by dipping or otherwise as known in the art. The device is used in the same form as the preferred form of the invention illustrated and described in FIGURES 1 and 2.

In FIGURE 4 of the drawings, an alternate fastening means is illustrated for the preferred form of the invention wherein the cap for soft seal plugs is provided with a toggle bolt 27 which extends through the opening 12 in the center of the bowed portion 11 as heretofore referred to. The head 28 of the toggle bolt 27 engages the washer 16 and holds the same tightly against the bonded sealing washer 13. The toggle member 29 pivoted to its yoke 30 is shown in retracted position in broken lines and in opened position in solid lines, and it will be observed that it is preferably of sufficient size to enable it to engage the inner wall of the member in which the soft seal plug is located as by spanning the area normally occupied by the soft seal plug.

It will occur to those skilled in the art that this form of the invention, like the forms illustrated in FIGURES 1, 2 and 3, requires that an opening be formed in the soft seal plug. It will occur to those skilled in the art that the toggle-bolt mounting as illustrated in FIGURE 4 and heretofore described may be equally efficiently used with the modified form of the sealing cap seen in FIGURE 3 wherein the same is completely enveloped in a water-proof resilient sealing coating.

It will thus be seen that a cap for a soft seal plug has been disclosed which meets the several objects of my invention, and having thus described my invention, what I claim is:

A cap for a soft seal plug comprising a rigid disc shaped body member having a central bowed area and a peripheral annular planar flange, said bowed area having a central opening, a first annular insulating sealing washer bonded to the inner face of said annular planar flange, a second annular insulating sealing washer bonded to the outside surface of said bowed area about said opening, said last named washer having an annular inwardly projecting portion contacting and covering the inner walls of said opening, a metal washer on the outer face of said last named washer, a pointed screw positioned in said opening and extending inwardly therefrom, and said screw having a head contacting said metal washer whereby said screw may be screwed into said soft plug and hold the cap in operative position.

References Cited

UNITED STATES PATENTS

| | | | |
|---|---|---|---|
| 2,007,179 | 7/1935 | Bullis | 220—25 |
| 2,594,599 | 4/1952 | Uhri | 220—25 |
| 2,853,203 | 9/1958 | Evans | 220—25 |

THERON E. CONDON, *Primary Examiner.*

LOUIS G. MANCENE, *Examiner.*

G. T. HALL, *Assistant Examiner.*